Dec. 24, 1963  D. BERLIN  3,115,364
CONVERTIBLE HAMMOCK AND SEAT
Filed April 6, 1960  3 Sheets-Sheet 1

INVENTOR.
DANIEL BERLIN
BY
Caesar and Rivise
ATTORNEYS.

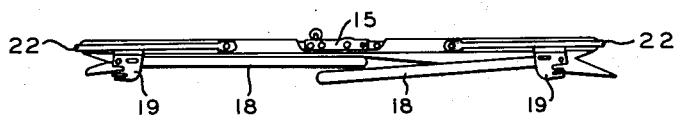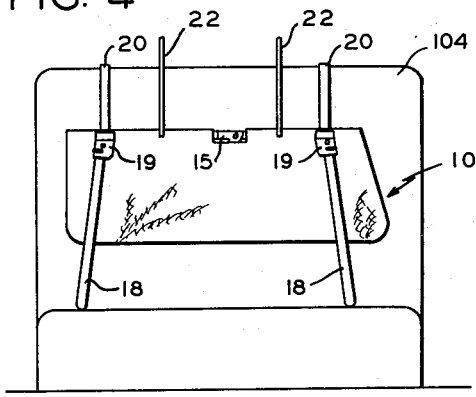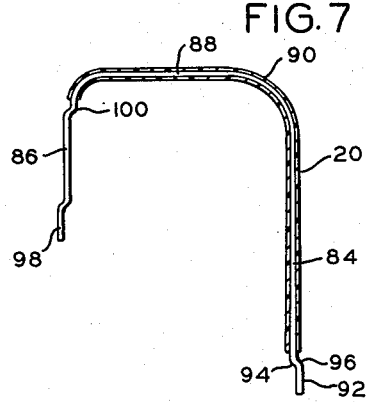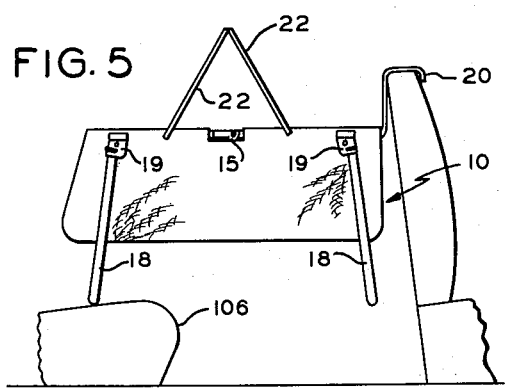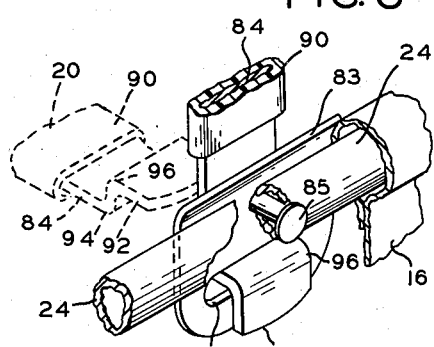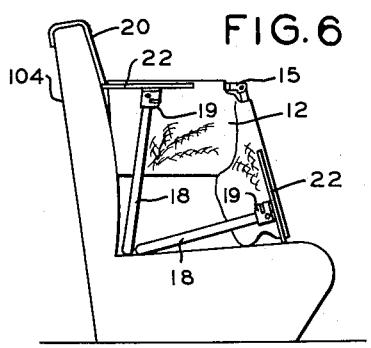

Dec. 24, 1963 D. BERLIN 3,115,364
CONVERTIBLE HAMMOCK AND SEAT
Filed April 6, 1960 3 Sheets-Sheet 3
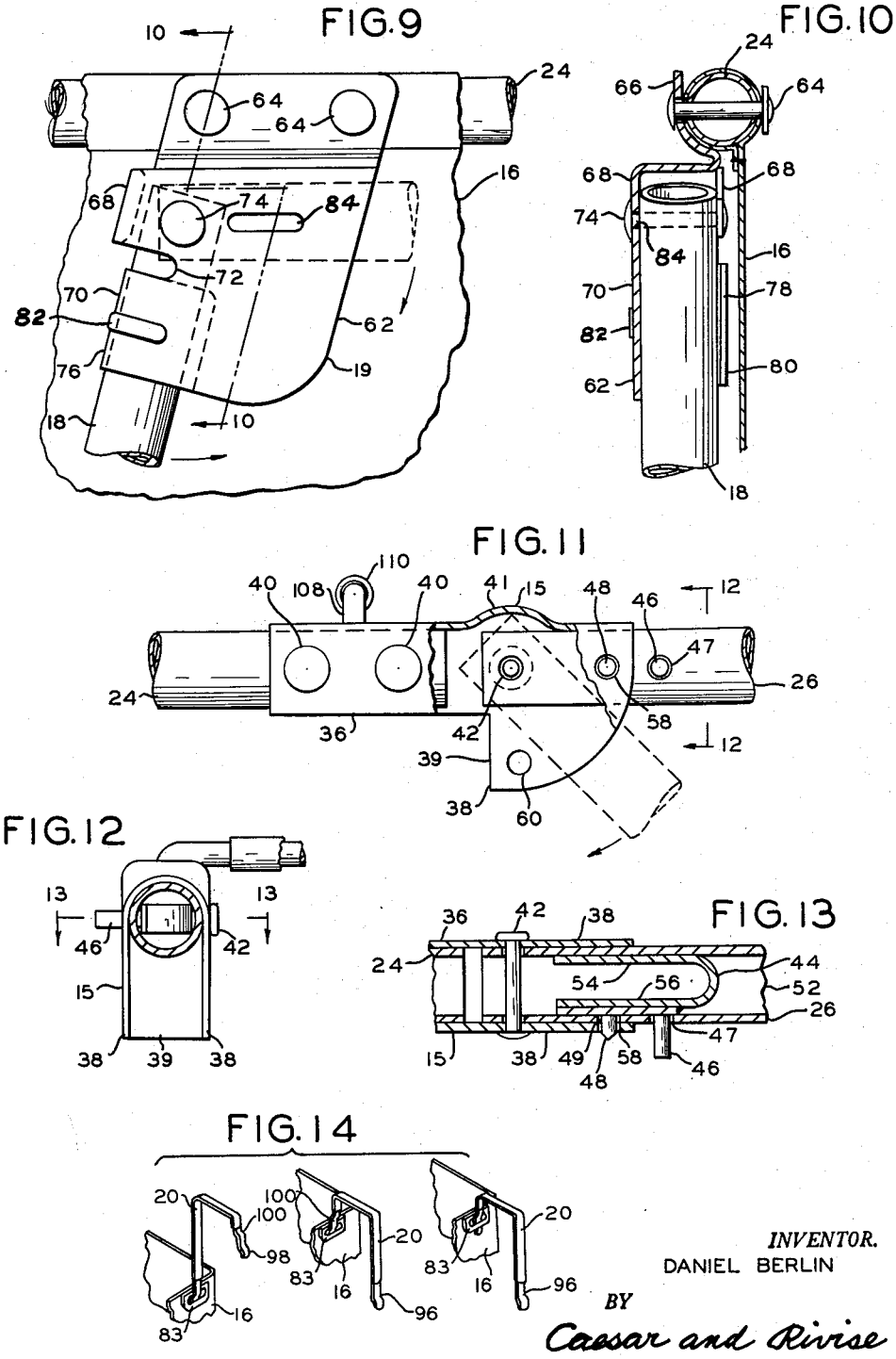
INVENTOR.
DANIEL BERLIN
BY
Caesar and Rivise
ATTORNEYS.

United States Patent Office 3,115,364
Patented Dec. 24, 1963

3,115,364
CONVERTIBLE HAMMOCK AND SEAT
Daniel Berlin, 4424 Paul St., Philadelphia 24, Pa.
Filed Apr. 6, 1960, Ser. No. 20,468
3 Claims. (Cl. 297—130)

This application is a continuation-in-part of application Serial No. 737,858, filed May 26, 1958, and entitled Child's Convertible Hammock and Car Seat, now abandoned.

The present invention relates to a child's hammock or bassinet which can be utilized either inside or outside of an automobile, and which is so constructed that it can be converted into a child's car seat for supporting a child within the automobile or on the back of a chair.

In the present mode of living it has become increasingly necessary, as a result of small apartments and expansion of automobile travel facilities, to have one device perform the function of several devices, and which when not in use can be collapsed into a small storage space. Such a plurality of uses and convertibility of functions has become particularly important in connection with small children whose growth and development is quite rapid. Thus, the outgrowing of a particular device's utility makes purchasing of a single unitary construction for a single function quite expensive.

The foregoing problem has given incentive to the introduction of many varying multi-function devices to meet the needs of a child. Such devices, however, have generally been quite complex and the ease of convertibility has been accordingly hindered.

It is therefore an object of the present invention to provide a child's hammock which may be easily converted into a seat for supporting a child within an automobile or on the back of a chair.

A further object of the present invention is to provide a convertible child's car seat which may be easily changed into a hammock or bassinet for suspension within an automobile or for ground support upon a floor.

Another object of the present invention is to provide a combined hammock, car seat, or high chair for children which may be easily converted into any one of the three constructions.

Still another object of the present invention is to provide a convertible bassinet and car seat for children which can be collapsed for storage within a small space.

Yet another object of the present invention is to provide a convertible hammock and seat for children which may be suspended in a plurality of positions within the automobile.

A further object of the present invention is to provide a chlid's convertible hammock and car seat having selectively attachable suspension hooks thereon for mounting in three positions, namely, a low, a medium and a high position.

A still further object of the present invention is to provide a child's hammock or bassinet which can be converted to a child's seat without the necessity of providing means, such as fastener means, to sever the unit into two halves.

Another object of the present invention is to provide a child's hammock or bassinet having leg members which may be safely held in an upstanding position with positive locking means which eliminate the need for a hinge brace.

A further object of the present invention is to provide a hammock or a bassinet for children which includes a frame of two U-shaped members disposed in opposing relation and held in the same plane by locking means which is releasable to permit the U-shaped members to pivot ninety degrees to be locked in a second position which converts the hammock or bassinet into a chair.

The foregoing and other objectives are achieved by providing a child's hammock that is convertible to a chair which includes a pair of opposed U-shaped members forming head and foot sections to which a cloth body is secured to hang therefrom, the ends of the legs of one of the U-shaped members are fixedly secured to a holding means, the ends of the legs of the other U-shaped member are pivotally secured to the holding means and may be locked in either of two positions. In one locked position the U-shaped members lie in the same plane to form a frame so that the present invention is adapted to serve as a hammock or a bassinet. In the second locked position the latter U-shaped member has been rotated ninety degrees and the U-shaped members lie in perpendicular planes so that the present invention is adapted to serve as a chair. Leg elements are pivotally secured to the U-shaped members and may be frictionally locked in the operative position at an obtuse angle by leg securing means so that the weight of the child in the bassinet tends to maintain the leg elements in operative position. In addition, hook means are removably secured to the sides or ends of the U-shaped members so that the present invention whether in the form of a bassinet or a chair may be suspended from an automobile seat or a chair in the home. Said hook means include bent portions at three different places thereon so that the bassinet or chair may be suspended in a high, medium or a low position.

Other objects and many of the attendant advantages of this invention will be readily appreciated as the same becomes better understood by reference to the following detailed description when considered in connection with the accompanying drawings wherein:

FIG. 3 is a side elevational view of the device of FIG. 1 with the hook means removed, and in a collapsed position;

FIG. 4 is a schematic view of the device of FIG. 1 suspended at one side from the front seat of an automobile;

FIG. 5 is a schematic view of the device of FIG. 1 suspended at one end from the front seat of an automobile and supported at its rear leg element by resting on the rear seat of an automobile;

FIG. 6 is a schematic view of the device of FIG. 2 suspended at its back from the front seat of an automobile;

FIG. 7 is a sectional view of a hook means;

FIG. 8 is an enlarged fragmentary perspective view with a portion of a U-shaped member and of a hook means cut away showing in full line the hook means removably secured to the U-shaped member and showing in phantom the position of the hook means immediately prior or subsequent to its removable securement to the U-shaped member;

FIG. 9 is an enlarged fragmentary side elevational view of the leg securing means of the present invention secured to the U-shaped members and showing in the full line a leg element moved to an open position and showing in phantom the leg element moved to a collapsed position;

FIG. 10 is a sectional view taken along the lines 10—10 of FIG. 9;

FIG. 11 is an enlarged fragmentary side elevational view partly in section of the holding means of the present invention secured to the U-shaped members and showing in full line one of the U-shaped members positioned in the same plane as the other U-shaped member and showing in phantom said U-shaped member rotated to a position intermediate said first named position and a position ninety degrees thereto;

FIG. 12 is a sectional view taken along the lines 12—12 of FIG. 11;

FIG. 13 is a sectional view taken along the lines 13—13 of FIG. 12; and

FIG. 14 is a fragmentary perspective view showing the three positions of securement of the hook means to a U-shaped member.

Figure 1:
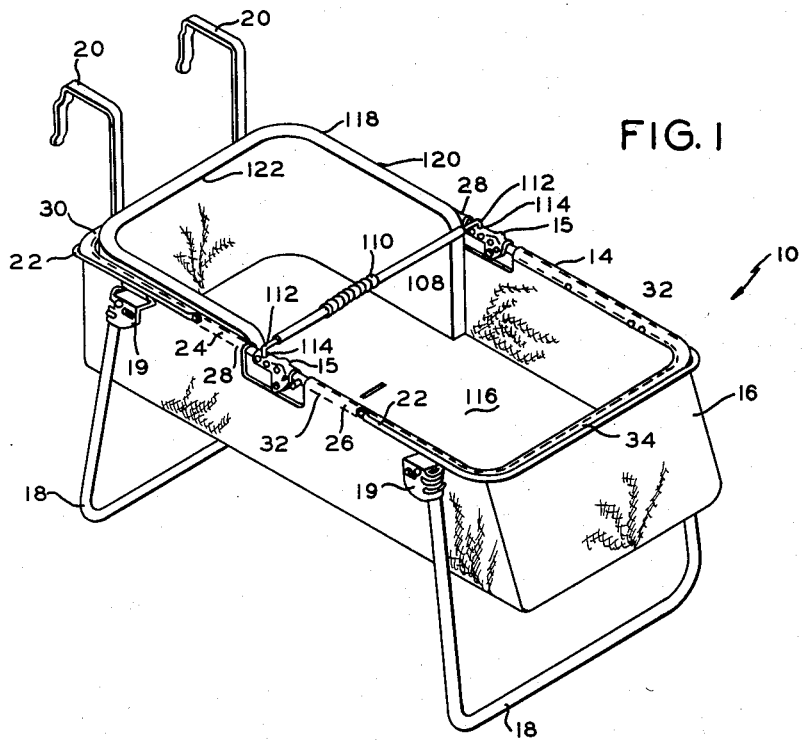
FIG. 1 is a perspective view of an embodiment of the present invention when assembled as a hammock or bassinet.
Figure 2:
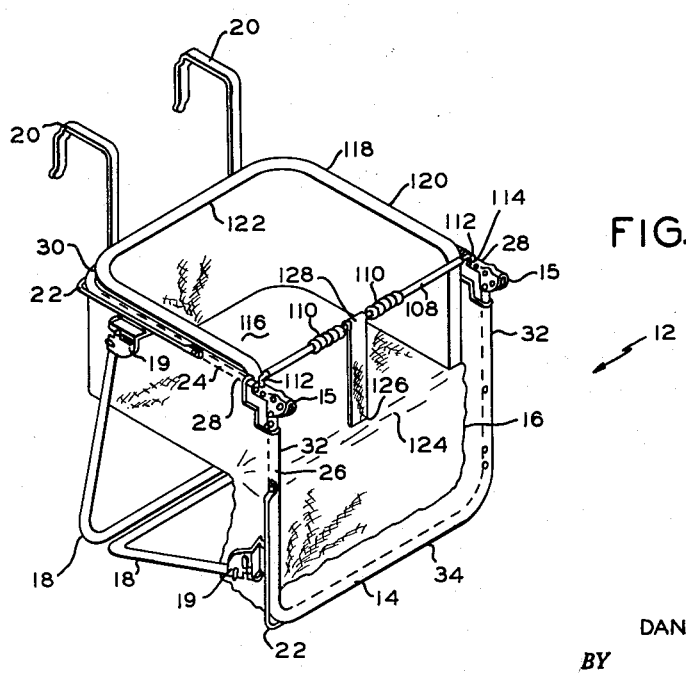
FIG. 2 is a perspective view of the device of FIG. 1 converted to a chair.

Referring now in a greater detail to the various figures of the drawings wherein similar reference characters refer to similar parts, a convertible hammock and seat embodying the present invention is shown at 10 in FIG. 1 assembled as a hammock or bassinet and at 12 in FIG. 2 as converted to a chair.

The present invention generally consists of a metallic frame 14, holding means 15, a cloth or plastic body 16, legs 18, hooks 20 and carrying bars 22.

Frame 14 consists of a pair of opposed hollow U-shaped members 24 and of tubular steel 26 to form head and foot sections respectively. Member 24 includes leg portions 28 and web 30. Member 26 includes leg portions 32 and web portion 34. Body portion 16 of cloth, plastic or the like is hemmed to provide a channel at its top edge for receiving U-shaped members 24 and 26 and hangs therefrom as shown in FIG. 8. Body portion 16 is of unitary construction and is not adapted to be severed into two halves as has been done in many devices heretofore known.

Holding means 15 (FIG. 11) is provided to lock the present invention in either the position of FIG. 1 to serve as a hammock or the position of FIG. 2 to serve as a chair. Holding means 15 may be constructed of metal and comprise a generally tubular housing 36 which is flared at its rearward portion to produce a pair of parallel downwardly extending wings 38 and web 39. Member 24 is telescoped within tubular housing 36 and is fixedly secured therein by rivets 40. Member 26 is pivotally mounted by rivet 42 between wings 38 and locking means 44 is provided on holding means 15 for locking member 26 either in the same plane as member 24 (as shown in FIGS. 1 and 11 to form a hammock) or rotated downwardly to lie in a plane perpendicular to the plane of member 24 (as shown in FIG. 2 to form a chair).

Locking means 44 is a bullet catch and comprises a flat headed actuating pin 46 and a shorter pointed locking pin 48 projecting respectively through openings 47 and 49 in member 26. Said pins are secured to a plate 50 positioned within bore 52 of member 26 as shown in FIG. 13. A U-shaped leaf spring 54 is also positioned within bore 52 so that arm 56 thereof urges plate 50 against the inner wall of member 26. This in turn urges actuating pin 46 and locking pin 48 to project outwardly from bore 52 as shown in FIG. 13. It is thus seen that member 26 is locked in the position of FIGS. 1 and 11 when actuating pin 46 is depressed and then released so that locking pin 48 may project through opening 49 in member 26 and opening 58 in wings 38 (FIG. 13). It is further seen that member 26 may be released from the position of FIGS. 1 and 13 and rotated downwardly by depressing actuating pin 46 so that the shorter locking pin 48 is withdrawn from openings 49 and 58 thereby removing any obstruction to the downward rotation of member 26.

Member 26 is then rotated downwardly ninety degrees until it nests between wings 38 and against web 39 which functions as a stop member. Such rotation is permitted by the provision of a convex projection 41 from means 16. In this position hole 49 of member 26 coincides with hole 60 in one of the wings 38 so that locking pin 48 may project therethrough to lock member 26 in the position of FIG. 2 as a chair.

Legs 18 are held in operative or upstanding position by securing means 19 which are clearly shown in FIGS. 9 and 10. Securing means 19 includes a flat plate 62 secured to members 24 or 26 by rivets 64 extending through a tab portion 66 projecting from the top of plate 62. Plate 62 also includes nesting portions 68 and 70 which lie at an obtuse angle to member 24. Nesting portions 68, 70 are formed by providing a slit 72 in plate 62 and bending the fingers which form slit 72 into a generally U-shape. Leg 18 is pivotally secured within nesting portion 68 by rivet 74 and in the operative position is positioned within nesting portion 70 and may bear against web 76 thereof which functions as a stop member. It is thus seen that any weight in the hammock will urge leg 18 against web 76 thereby enhancing the stability of the hammock A similar weight distribution and enhanced stability is also present when the invention is converted to a chair as shown in FIG. 2. In addition arm 78 of nesting portion 70 includes a depressed area 80 which provides a close clearance for leg 18 when entering or leaving nesting portion 70 so that leg 18 is also frictionally retained in nesting portion 70 which may be reinforced by a lateral strip 82. Plate 62 also includes a slot 84 for reception of hook means 20 which will now be discussed. In this connection hook means 20 may be secured at one end of the present invention by slotted end plates 83 (FIG. 8) secured to the web of member 24 or member 26 by rivets 85.

Hook means 20 as shown in FIG. 7 includes a relatively long leg 84, a relatively short leg 86 and a bridging portion 88 integral with said legs. A rubber sleeve 90 is slipped over each hook means 20 to enhance the appearance thereof and for protection of the automobile seat or chair from which the present invention is suspended.

The end of leg 84 includes an offset tab portion 92 with a rounded end lying in a plane substantially parallel to the plane of leg 84 and formed by twice bending leg 84 at 94 and 96. In a similar manner leg 86 includes a tab portion 98 with a rounded end. Still another tab portion 100 is formed in a similar manner at the upper end of leg 86. It is thus seen that hook means 20 may be secured to a U-shaped member 24 or 26 by insertion in slot 82 of a securing means 19 or in the slot of end plate 83 as shown in FIG. 8 of any one of tab means 92, 98 or 100. Thus as shown in FIG. 8 in phantom hook means 20 is positioned with respect to slot 102 of plate 83 so that tab 92 may be slipped through said slot 102. The hook means 20 then need only be rotated ninety degrees upwardly to the full line position of FIG. 8 and hook means 20 pushed against plate 83 to safely secure the hook means to the hammock or chair. When tab 92 is secured to the hammock or chair as shown in FIG. 14, the device is hung in a low position. When tab 98 is employed as shown in FIG. 14, the device is hung in an intermediate position. When tab 100 is employed as shown in FIG. 14, the device is hung in a high position. Thus any one of three hanging positions is obtainable by use of the hook means 20 of the present invention.

It should be noted as shown in FIGS. 4, 5 and 6 that the hammock or chair of the present invention can be employed in a plurality of positions. FIG. 4 shows hammock 10 suspended at its side from the front seat 104 of an automobile. FIG. 5 shows hammock 10 suspended at its end from the front seat 104 of an automobile with rear legs 18 resting on the rear seat 106 of an automobile. FIG. 6 shows chair 12 suspended at its back from the front seat 104 of an automobile.

For ease of portability U-shaped carrying members 22 pivotally secured to members 24 or 26 are provided. Additionally, a bead bar 108 with beads 110 may be secured to the device by inserting fingers 112 thereof into openings 114 in the top of holding means 15. A pad 116 with an upstanding forward section 118 having wings 120 and web 122 is provided to fit within the interior of hammock 10 or chair 12 and is foldable at 124 when the device is converted to a chair. A tongue 126 secured at one end to body 16 underneath pad 116 may be passed through pad 116 via slot 126 therein. Tongue 126 is hemmed at its upper end to provide a channel 128 so that tongue 126 may be slipped onto bead bar 108 as shown in FIG. 2.

Furthermore, as shown in FIG. 3, the present invention when in the form of a hammock may be collapsed to said position of FIG. 3 by folding legs 18 under device, rotating carrying members 22 to end positions and removing hook means 20.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a hammock adapted to be converted to a chair including first and second opposed U-shaped members, each having legs and a web portion forming head and foot sections, a body suspended from said first and second members, said first and second members being pivotally secured together, the improvement comprising leg securing means including a pair of plates secured to each of said U-shaped members, each pair of said plates having pivotally secured thereto a pair of supporting legs for said hammock, each plate containing a U-shaped nesting portion having a rear wall extending at an obtuse angle from said U-shaped members, whereby said supporting legs may be releasably locked at said obtuse angle within the nesting portion by the weight of a child in said hammock forcing said supporting legs against said rear wall, and a pair of hook means detachably secured to said U-shaped members, said hook means including a relatively short leg and a relatively long leg extending substantially parallel to said short leg and a bridging portion integral with said legs, the ends of said legs each having a first offset tab portion lying in a plane substantially parallel to the planes of said legs, said tab portion being releasably engaged in a slot associated with said U-shaped members.

2. The invention of claim 1 including a second offset tab portion formed intermediate the end of one of said legs, said second tab portion lying in a plane substantially parallel to the planes of said legs.

3. The improvement of claim 1 wherein said U-shaped nesting portion includes an opening which is narrower than the remainder of said portion whereby said supporting legs may be frictionally retained therein.

References Cited in the file of this patent

UNITED STATES PATENTS

| | | |
|---|---|---|
| 1,226,324 | Gage | May 15, 1917 |
| 2,047,389 | Sinclair | July 14, 1936 |
| 2,483,043 | Golden | Sept. 27, 1949 |
| 2,488,225 | Mover | Nov. 15, 1949 |
| 2,636,548 | Berlin | Apr. 28, 1953 |
| 2,701,602 | Baker | Feb. 8, 1955 |
| 2,709,478 | Golding et al. | May 31, 1955 |
| 2,730,163 | Goldberg | Jan. 10, 1956 |
| 2,805,704 | Arseev | Sept. 10, 1957 |
| 2,949,628 | Koltun | Aug. 23, 1960 |